(12) United States Patent
Hasegawa (10) Patent No.: US 8,977,319 B2
(45) Date of Patent: Mar. 10, 2015

(54) PORTABLE ELECTRONIC DEVICE AND METHOD FOR CONTROLLING PORTABLE ELECTRONIC DEVICE

(75) Inventor: Junichi Hasegawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 142 days.

(21) Appl. No.: 13/515,388

(22) PCT Filed: Dec. 9, 2010

(86) PCT No.: PCT/JP2010/072091
§ 371 (c)(1),
(2), (4) Date: Jun. 12, 2012

(87) PCT Pub. No.: WO2011/074465
PCT Pub. Date: Jun. 23, 2011

(65) Prior Publication Data
US 2012/0252539 A1 Oct. 4, 2012

(30) Foreign Application Priority Data
Dec. 15, 2009 (JP) ................................. 2009-284225

(51) Int. Cl.
*H04B 1/38* (2006.01)
*G06F 3/0488* (2013.01)
*H04M 1/725* (2006.01)

(52) U.S. Cl.
CPC ....... *G06F 3/04883* (2013.01); *H04M 1/72552* (2013.01); *H04M 2250/22* (2013.01); *H04M 2250/70* (2013.01)
USPC ........... 455/566; 715/702; 715/863; 345/173; 235/472.01; 235/439

(58) Field of Classification Search
USPC .............................. 715/702, 863; 235/472.01
See application file for complete search history.

(56) References Cited

U.S. PATENT DOCUMENTS

| | | | |
|---|---|---|---|
| 7,004,394 B2* | 2/2006 | Kim | 235/472.01 |
| 2004/0145574 A1* | 7/2004 | Xin et al. | 345/173 |
| 2008/0225014 A1* | 9/2008 | Kim | 345/173 |
| 2009/0222770 A1* | 9/2009 | Chang | 715/863 |
| 2011/0010619 A1* | 1/2011 | Brown | 715/702 |

FOREIGN PATENT DOCUMENTS

| | | |
|---|---|---|
| JP | 2000-222522 A | 8/2000 |
| JP | 2000-315118 A | 11/2000 |
| JP | 2007-18290 A | 1/2007 |
| JP | 2008-141519 A | 6/2008 |

OTHER PUBLICATIONS

Notice of Reasons for Rejection issued to JP Application No. 2009-284225, mailed Oct. 29, 2013, 3 pages.

* cited by examiner

*Primary Examiner* — Junpeng Chen
(74) *Attorney, Agent, or Firm* — Hoffmann & Baron, LLP (57) ABSTRACT

Disclosed are a portable electronic device and a method for controlling the portable electronic device wherein it is possible to use an application enabling an easy input of characters. The portable electronic device is provided with a starting unit, a display unit, a detection unit, and a control unit. The starting unit starts the application enabling the input of characters. The display unit displays a screen based on the application. The detection unit detects a contact to the display unit. The control unit causes the starting unit to start the application when identifying, while a standard screen is displayed on the display unit, the track of the contact to the display unit according to the contact to the display unit detected by the detection unit and determining from the detected track of the contact that characters are being inputted.

11 Claims, 10 Drawing Sheets

PORTABLE ELECTRONIC DEVICE AND METHOD FOR CONTROLLING PORTABLE ELECTRONIC DEVICE

CROSS-REFERENCE TO RELATED APPLICATIONS

This application is the National Stage of International Application No. PCT/JP2010/072091, filed Dec. 9, 2010, which claims the benefit of Japanese Application No. 2009-284225, filed Dec. 15, 2009, the entire contents of both of which are incorporated by reference herein.

FIELD OF THE INVENTION

The present invention relates to a portable electronic device including a touch panel, and to a method of controlling the portable electronic device.

BACKGROUND OF THE INVENTION

Some portable electronic devices include a touch panel having: a display unit; a detection unit that detects a finger or the like that touches the display unit; and a control unit that controls display contents on the display unit in accordance with a result of detection by the detection unit. In such portable electronic devices, in a case in which a standard screen is displayed on the display unit, when a finger or the like touches an area that triggers displaying of a menu screen that includes a plurality of areas for activating applications, the menu screen is displayed on the display unit. As a result, a user can activate a desired application by selecting an area for activating the desired application from the menu screen (see Patent Document 1).

Patent Document 1: Japanese Unexamined Patent Application, Publication No. 2008-141519

SUMMARY OF THE INVENTION

Problems to be Solved by the Invention

Incidentally, in the portable electronic device including the touch panel, in a case of activating an application enabling an input of characters (for example, a memo pad application), first of all, while a standard screen is displayed on the display unit, when an area that triggers displaying of a menu screen is operated (touched), the menu screen is displayed on the display unit. Next, when the user selects the memo pad application from the menu screen, the portable electronic device activates the memo pad application. In this way, the conventional portable electronic devices had a problem of requiring a large number of operations for activating an application enabling an input of characters.

An object of the present invention is to provide a portable electronic device and a method of controlling the portable electronic device, all of which can utilize an application enabling an easy input of characters.

Means for Solving the Problems

The portable electronic device of the present invention is characterized by including: an activation unit that activates an application enabling an input of characters; a display unit that displays a screen based on the application; a detection unit that detects contact to the display unit; and a control unit that identifies a track of contact to the display unit according to the contact to the display unit detected by the detection unit in a state where a standard screen is displayed on the display unit, and causes the activation unit to activate the application in a case in which the control unit determines that characters are being input based on the track of contact thus identified.

In a case in which the control unit determines that characters are being input based on the track of contact, it is preferable for the activation unit to activate an application based on an input character thus input.

It is preferable for the application based on the input character to be an application having an application name including the input character.

In a case in which application names of a plurality of applications predicted based on the input character are displayed on the display unit, it is preferable for the application based on the input character to be an application corresponding to a single application name selected from the plurality of application names.

In a case in which the control unit determines that characters are being input based on the track of contact, it is preferable for the control unit to cause the activation unit to activate an application, and to cause an input character to be input into the application.

It is preferable for the application activated by the activation unit to be a preset application.

In a case in which application names of a plurality of applications enabling an input of characters are displayed on the display unit, it is preferable for the application activated by the activation unit to be an application corresponding to a single application name selected from the plurality of application names.

After the input character is input into the application, in a case in which a single application is selected from applications enabling an input of characters, it is preferable for the control unit to cause the single application thus selected to be activated, and to cause the input character to be input into the single application.

It is preferable for the control unit to cause the display unit to display a plurality of words predicted based on the input character, and when a single word is selected from the plurality of words, it is preferable for the control unit to cause the activation unit to activate the application, and to cause the word thus selected to be input into the application.

It is preferable for the activation unit to be capable of activating a call originating application, and it is preferable for the control unit to be capable of determining that numeric characters are being input based on the track of contact, and in a case of determining that the numeric characters are being input based on the track of contact detected by the detection unit, it is preferable for the control unit to cause the activation unit to activate the call originating application.

In a case in which the control unit determines that characters or numeric characters are not being input based on the track of contact detected by the detection unit, it is preferable for the control unit to cause the display unit to display a menu screen for selecting an application from a plurality of applications.

The present invention is a method of controlling a portable electronic device including a display unit capable of displaying a screen based on an application enabling an input of characters, and the method is characterized by including: a detecting step of detecting contact to the display unit; and an activating step of identifying a track of contact to the display unit according to the contact to the display unit detected in the detecting step in a state where a standard screen is displayed on the display unit, and activating the application in a case of determining that characters are being input based on the track of contact thus identified.

Effects of the Invention

According to the present invention, it is possible to utilize an application enabling an easy input of characters.

EXPLANATION OF REFERENCE NUMERALS 1 mobile telephone device (portable electronic device)
10 touch panel
11 display unit
12 detection unit
18 activation unit
19 control unit

DETAILED DESCRIPTION OF THE INVENTION

Figure 1:
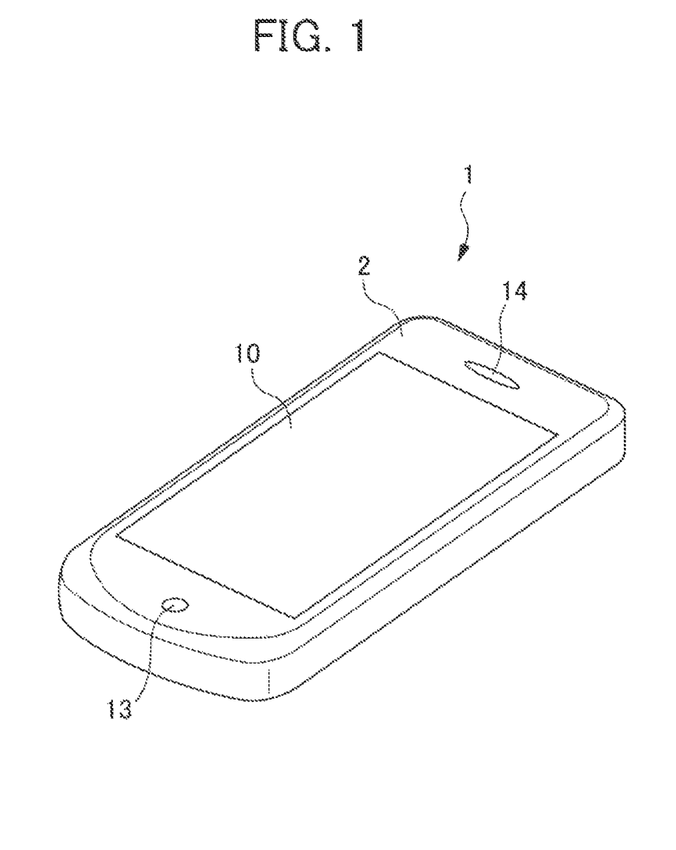
FIG. 1 is a perspective view showing an appearance of a mobile telephone device according to an embodiment of a portable electronic device.

A preferred embodiment for carrying out the present invention is hereinafter described with reference to the drawings. First of all, with reference to FIG. 1, descriptions are provided for a basic structure of a mobile telephone device 1 according to an embodiment of the portable electronic device of the present invention. FIG. 1 is a perspective view showing an appearance of the mobile telephone device 1 according to an embodiment of the portable electronic device.

The mobile telephone device 1 includes a body 2. A touch panel 10, a microphone 13 and a speaker 14 are disposed on a front face portion of the body 2.

Figure 2:
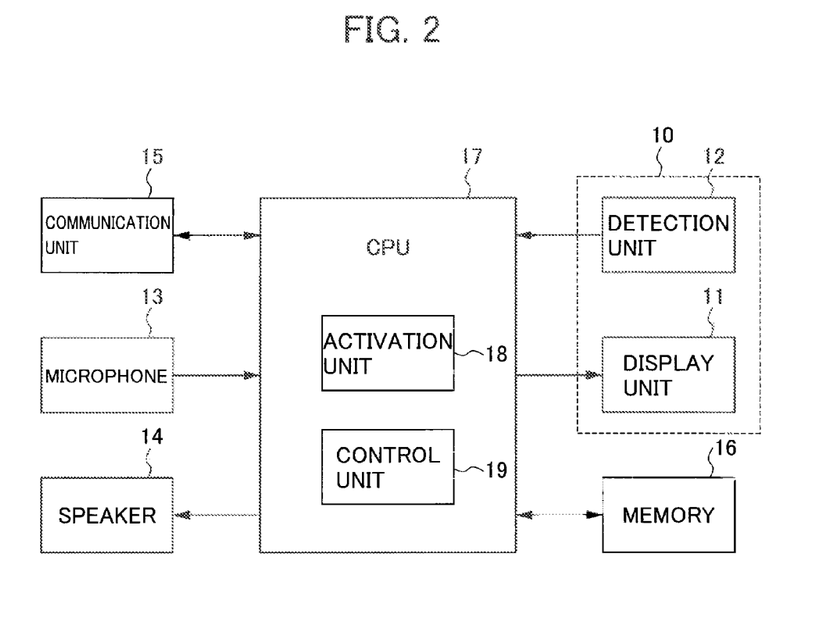
FIG. 2 is a block diagram showing a functional configuration of the mobile telephone device.

The touch panel 10 includes a display unit 11 and a detection unit 12 (see FIG. 2). The display unit 11 is a liquid-crystal display panel, an organic EL (electroluminescence) display panel, or the like. The detection unit 12 is a sensor for detecting a position or the like touched by a contact object such as a finger or a stylus of a user. For example, a sensor that employs a method such as a capacitive sensing method and a resistive film method can be utilized as the detection unit 12.

The microphone 13 is used for inputting sound produced by the user of the mobile telephone device 1 during a telephone call.

The speaker 14 is used for outputting sound produced by the other party of the telephone call.

Next, a functional configuration of the mobile telephone device 1 is described with reference to FIG. 2. FIG. 2 is a block diagram showing the functional configuration of the mobile telephone device 1.

The mobile telephone device 1 includes the touch panel 10 (the display unit 11 and the detection unit 12), the microphone 13 and the speaker 14 as described above. The mobile telephone device 1 includes a communication unit 15, memory 16 and a central processing unit (CPU 17).

The communication unit 15 includes a main antenna (not shown) and an RF circuit unit (not shown), and performs communication with a predetermined communication party. The communication party, with which the communication unit 15 performs communication, is an external device that performs a telephone call or transmission/reception of mail with the mobile telephone device 1, or an external device or the like such as an external web server, with which the mobile telephone device 1 establishes Internet connections.

The communication unit 15 performs communication with an external device via a predetermined usable frequency band. More specifically, the communication unit 15 executes demodulation processing on a signal received via the main antenna, and transmits the processed signal to the control unit 19. The communication unit 15 executes modulation processing on a signal transmitted from the CPU 17 (the control unit 19 to be described below), and transmits the signal to an external device (a base station) via the main antenna.

The memory 16 includes, for example, working memory, and is utilized for arithmetic processing by the CPU 17 (the control unit 19). The memory 16 stores data, tables and the like, which are utilized by various applications running inside the mobile telephone device 1. The memory 16 may also serve as detachable external memory.

The CPU 17 (the control unit 19) controls the entirety of the mobile telephone device 1, and performs predetermined control of the communication unit 15 and the display unit 11. The CPU 17 (the control unit 19) receives a result of detection by the detection unit 12, and executes various processing based on the result of detection as various input operations.

The mobile telephone device 1 with such a configuration has a function capable of utilizing an application enabling an easy input of characters. Descriptions are hereinafter provided for a configuration and operations for achieving the aforementioned function according to the mobile telephone device 1.

The CPU 17 includes an activation unit 18 and the control unit 19.

The activation unit 18 activates an application enabling an input of characters. Specific examples of the application enabling an input of characters may include a memo pad application, a mail application, a browser application, an address book application and the like.

The display unit 11 displays a screen based on an application activated by the activation unit 18. More specifically, in a case in which the activation unit 18 activates an application, the display unit 11 displays a character (an input character) that is input into the application, in accordance with control by the control unit 19. More specific descriptions are provided by taking the memo pad application as an example. In a case in which the activation unit 18 activates the memo pad application, the display unit 11 displays input characters in an area for inputting characters of a memo pad in accordance with the memo pad application, and displays a screen for inputting characters when a predetermined operation is carried out to input characters.

The display unit 11 displays a standard screen (also referred to as wallpaper, desktop or stand-by screen) while waiting for communication, or while waiting for activation of an application.

The detection unit 12 detects contact of a contact object such as a finger or a stylus of the user with the display unit 11. As a result, the detection unit 12 detects a state where the display unit 11 is touched by the contact object (a state where the contact object does not move on the surface of the display unit 11), and a state where the contact object moves on the surface of the display unit 11, as contact of the contact object with the display unit 11. The detection unit 12 outputs, to the control unit 19, information (position information) about a position of the contact object touching the display unit 11 (the detection unit 12), and information (position information) about moving positions of the contact object in a case in which the contact object moves on the surface of the display unit 11 (the detection unit 12).

In a state where the standard screen is displayed on the display unit 11, the control unit 19 identifies a track of contact to the display unit 11 according to the contact to the display unit 11 detected by the detection unit 12, and in a case in which the control unit 19 determines that characters are being input based on the track of contact thus identified, the control unit 19 causes the activation unit 18 to activate an application.

More specifically, based on the position information (information about positions where the contact object moves) provided from the detection unit 12, the control unit 19 identifies a track of contact of the contact object that moves while touching the surface of the display unit 11.

The control unit 19 determines whether characters are being input, based on the track of contact of the contact object. For example, the determination may be made as follows. More specifically, the control unit 19 compares an identified track with character recognition data that is stored beforehand in the memory 16 (data for associating a character with a track pattern of writing the character), and in a case in which the identified track coincides with the track in the character recognition data, the control unit 19 determines that a character associated with the track in the character recognition data is being input. On the other hand, in a case in which the identified track does not coincide with the track in the character recognition data, the control unit 19 determines that characters are not being input.

In a case in which the control unit 19 determines that characters are being input, the control unit 19 causes the activation unit 18 to activate an application enabling an input of characters.

Herein, the characters include hiragana, katakana, kanji and alphabetic characters.

Figure 3:
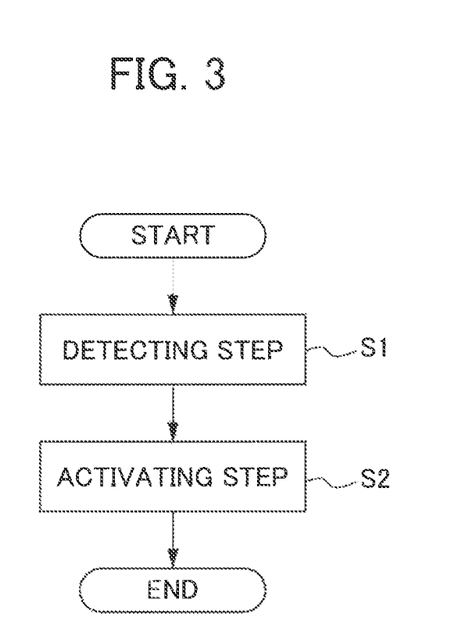
FIG. 3 is a flow chart for illustrating a method of controlling the mobile telephone device.

Next, descriptions are provided for a method of controlling the mobile telephone device 1. FIG. 3 is a flow chart for illustrating the method of controlling the mobile telephone device 1.

The mobile telephone device 1 performs a detecting step (Step S1) and an activating step (Step S2).

In the detecting step in Step S1, the detection unit 12 detects contact to the display unit 11.

In the activating step in Step S2, in a state where the standard screen is displayed on the display unit 11, the control unit 19 identifies a track of contact to the display unit 11 according to the contact to the display unit 11 detected in the detecting step, and in a case in which the control unit 19 determines that characters are being input based on the track of the contact, an application enabling an input of characters is activated.

As discussed above, by writing a character on the display unit 11 (the detection unit 12) with a contact object while the standard screen is displayed on the display unit 11, the mobile telephone device 1 determines that characters are being input based on the track of contact of the contact object, an application enabling an input of characters is activated, and the application can be utilized. Thus, the mobile telephone device 1 can reduce the number of operations required for activating an application, as compared to conventional cases.

In a case in which the activation unit 18 activates an application enabling an input of characters, the control unit 19 may cause the display unit 11 to display (dispose) keys enabling an input of characters in order to input characters thereafter. In a case in which a key displayed on the display unit 11 is operated (touched), the detection unit 12 provides information about a touched position (position information) to the control unit 19. Based on the position information thus provided, the control unit 19 determines what character is assigned to the touched key, and based on a result of the determination, the control unit 19 causes the application to input a character assigned to the touched key. Here, the control unit 19 may display keys enabling an input of hiragana characters on the display unit 11 in a case in which the input character is a hiragana character, may display keys enabling an input of katakana characters on the display unit 11 in a case in which the input character is a katakana character, and may display QWERTY keys enabling an input of alphabetic characters on the display unit 11 in a case in which the input character is an alphabetic character.

In a state where the standard screen is displayed on the display unit 11, and the display unit 11 displays an area to which a predetermined function is assigned, such as a short-cut icon (an icon for activating a predetermined application), in a case in which the short-cut icon (an area to which a predetermined function is assigned) on the display unit 11 (the detection unit 12) is touched with a contact object, the control unit 19 does not determine whether characters are being input. In this case, the control unit 19 may activate the predetermined application corresponding to the short-cut icon.

In a case in which the control unit 19 determines that characters are being input based on the track of contact, it is preferable for the activation unit 18 to activate an application based on an input character thus input.

More specifically, in a case in which a character is input by way of a contact object via the display unit 11 (the detection unit 12), the control unit 19 performs character recognition by comparing the track of contact and the track in the character recognition data. In a case in which the input character is identified based on the character recognition, the control unit 19 causes the activation unit 18 to activate an application based on the input character. The control unit 19 controls the display unit 11 to display a screen based on the application activated by the activation unit 18.

Here, as a case in which an application is activated based on an input character, for example, data for associating an input character with an application is stored beforehand in the memory 16, and when the input character is identified based on character recognition, the control unit 19 may refer to the data stored in the memory 16, and may cause the activation unit 18 to activate the application associated with the input character.

Figure 5A:
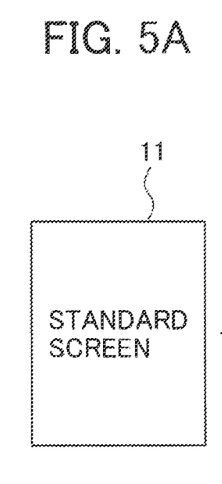
FIG. 5 is a diagram for illustrating a first state of the display unit 11.
Figure 5B:
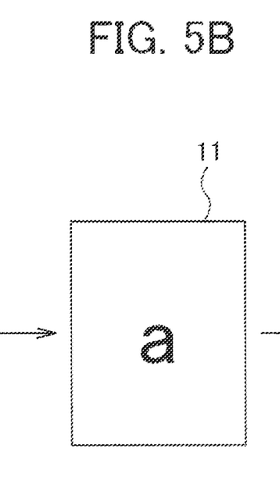
Figure 5C:
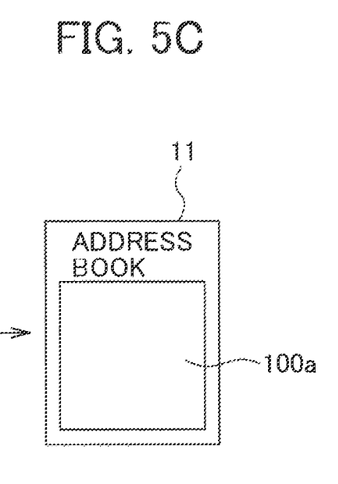

A specific example is described with reference to FIG. 5. FIG. 5 is a diagram for illustrating a first state of the display unit 11. First of all, the data for associating a hiragana character "a" with the address book application is stored in the memory 16. In a state where the standard screen is displayed on the display unit 11 (see FIG. 5A), in a case in which the hiragana character "a" is input by way of a contact object via the display unit 11 (the detection unit 12) (see FIG. 5B), the control unit 19 performs character recognition by comparing the track of contact and the track in the character recognition data. In a case in which the input character is identified as the hiragana character "a" based on the character recognition, the control unit 19 refers to the data stored in the memory 16, identifies the address book application associated with the input hiragana character "a", and controls the address book application to be activated. The control unit 19 controls the display unit 11 to display a screen (image) of the address book application thus activated (see FIG. 5C). In this case, the screen of the address book application includes an area (a character input area 100a) for inputting characters.

As a case in which an application is activated based on an input character, the activation unit 18 may activate an application having an application name that includes the input character, as will be described below.

Therefore, since an application is activated based on an input character, the mobile telephone device 1 can easily activate an application associated with the input character, simply by determining that characters are being input.

Here, as a case in which the activation unit 18 activates an application based on an input character, the control unit 19 may cause the activation unit 18 to activate an application having an application name that includes an input character.

More specifically, in a case in which the input character is identified based on character recognition, the control unit 19 determines whether the input character is included in any one of a plurality of application names stored beforehand in the memory 16. In a case in which the control unit 19 determines that the input character is included in any one of the application names, the control unit 19 causes the activation unit 18 to activate an application corresponding to the application name.

Specific descriptions are provided by taking an example, in which the address book application is activated. The memory 16 stores "address book" as an application name of the address book application. First of all, in a case in which the user writes a hiragana character "a" on the surface of the display unit 11 (the detection unit 12), the control unit 19 performs character recognition based on a track of writing the hiragana character "a". As a result of the character recognition, the control unit 19 determines that the input character is the hiragana character "a", and determines whether there is an application name including the input character among the plurality of application names stored in the memory 16. The control unit 19 identifies "address book" as the application name including the input character "a", and causes the activation unit 18 to activate the address book application.

In addition to the specific example described above in which the control unit 19 performs control to activate a corresponding application in a case in which an initial character of the application name is input as an input character, the control unit 19 may also perform control to activate a corresponding application in a case in which a character other than the initial character of the application name is input as an input character. For example, in a case in which a hiragana character "re" is input as an input character, the control unit 19 may perform control such that "address book" (including "re") is identified as an application name, and the address book application is activated.

Figure 6A:
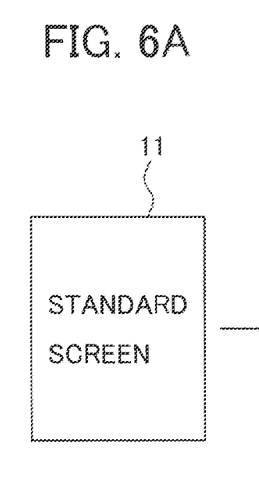
FIG. 6 is a diagram for illustrating a second state of the display unit 11.
Figure 6B:
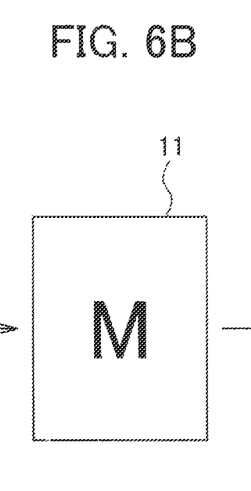
Figure 6C:
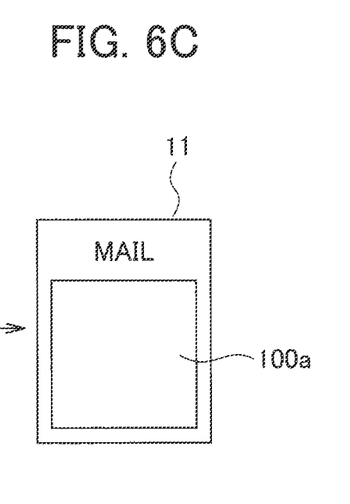
Figure 7A:
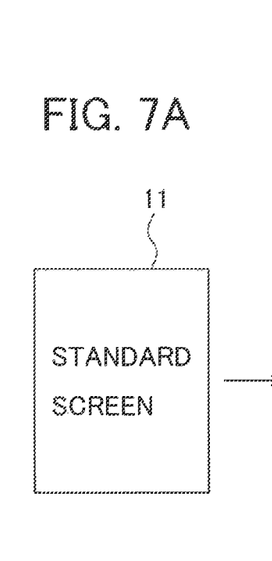
FIG. 7 is a diagram for illustrating a third state of the display unit 11.
Figure 7B:
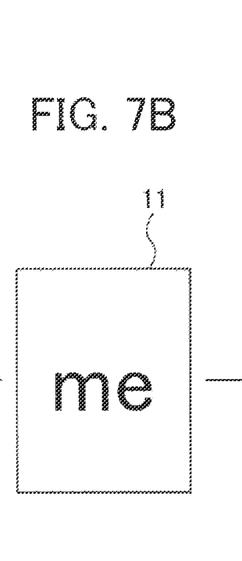
Figure 7C:
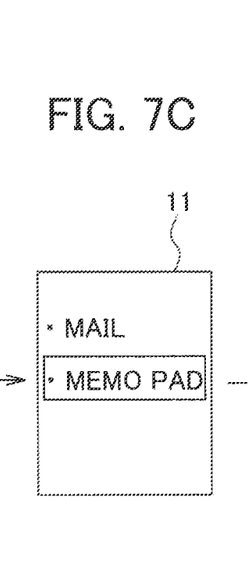
Figure 7D:
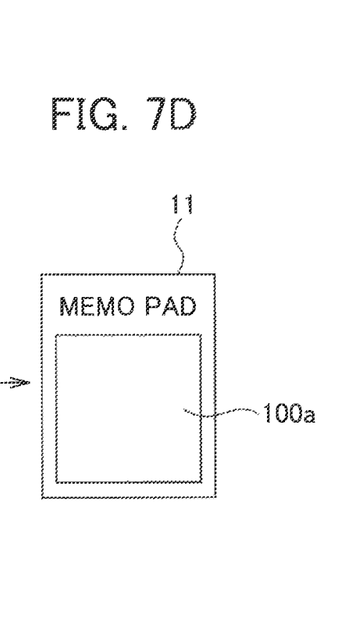

With reference to FIG. 6, descriptions are provided for an example in which an application is activated based on an input alphabetic character. FIG. 6 is a diagram for illustrating a second state of the display unit 11. First of all, as an application name of the mail application, "Mail" is registered with the memory 16. In a state where the standard screen is displayed on the display unit 11 (see FIG. 6A), in a case in which an alphabetic character "M" is input by way of a contact object via the display unit 11 (the detection unit 12) (see FIG. 6B), the control unit 19 performs character recognition by comparing the track of contact and the track in the character recognition data. As a result of the character recognition, the control unit 19 determines that the input character is the alphabetic character "M", and determines whether there is an application name including the alphabetic character "M" among the plurality of application names stored in the memory 16. The control unit 19 identifies "Mail" as the application name including the alphabetic character "M", and causes the activation unit 18 to activate the mail application. The control unit 19 controls the display unit 11 to display a screen (image) of the mail application thus activated (see FIG. 6C). In this case, the screen of the mail application includes the character input area 100a.

In addition to the aforementioned example in which the control unit 19 performs control to activate a corresponding application in a case in which an initial character of the application name is input as an input character, the control unit 19 may also perform control to activate a corresponding application in a case in which a character other than the initial character of the application name is input as an input character. For example, in a case in which an alphabetic character "L" is input as an input character, the control unit 19 may perform control such that "Mail" (including "L") is identified as an application name, and the mail application is activated.

Therefore, since an application is activated based on an input character, the mobile telephone device 1 can easily activate an application associated with the input character, simply by determining that characters are being input.

As a case in which the activation unit 18 activates an application based on an input character, the control unit 19 may cause the display unit 11 to display a plurality of application names that are predicted based on the input character, and may cause the activation unit 18 to activate an application corresponding to an application name selected from the plurality of application names.

More specifically, in a case in which an input character is identified based on character recognition, the control unit 19 determines whether there is an application name predicted from the input character among the plurality of application names stored beforehand in the memory 16. In a case in which the control unit 19 determines that there is an application name predicted from the input character, the control unit 19 controls the display unit 11 to display the application name predicted from the input character. In a case in which the user selects any one of the application names displayed on the display unit 11, the control unit 19 controls the activation unit 18 to activate an application corresponding to the application name thus selected.

Here, with reference to FIG. 7, descriptions are provided for an example in which a memo pad application is activated. FIG. 7 is a diagram for illustrating a third state of the display unit 11. The memory 16 stores "memo pad" as an application name of the memo pad application, and stores "mail" as an application name of the mail application. In a state where the standard screen is displayed on the display unit 11 (see FIG. 7A), in a case in which the user writes a hiragana character "me" on the surface of the display unit 11 (the detection unit 12) (see FIG. 7B), the control unit 19 performs character recognition based on a track of writing the hiragana character "me". As a result of the character recognition, the control unit 19 determines that the input character is the hiragana character "me", and determines whether there is an application name predicted from the input hiragana character "me". The control unit 19 determines that there are application names "memo pad" and "mail" predicted from the input hiragana character "me" (pronounced like "meh" in Japanese), and controls the display unit 11 to display the application names "memo pad" and "mail" (see FIG. 7C). In a case in which the user selects "memo pad", the control unit 19 causes the activation unit 18 to activate the memo pad application. The control unit 19 controls the display unit 11 to display a screen (image) of the memo pad application thus activated (see FIG. 7D). In this case, the screen of the memo pad application includes the character input area 100a.

Whether there is an application name predicted from the input character "me" may be determined based on whether there is an application name including the input character "me", or whether there is data in which the input character "me" is associated beforehand with application names.

As discussed above, the mobile telephone device 1 causes the display unit 11 to display application names predicted from an input character, and in a case in which any one of the application names is selected, an application corresponding to the application name thus selected is activated. Thus, the mobile telephone device 1 can easily activate an application associated with an input character.

In a case in which the control unit 19 determines that characters are being input based on the track of contact, it is preferable for the activation unit 18 to activate an application, and it is preferable for an input character to be input into the application.

More specifically, in a case in which a character is input by way of a contact object via the display unit 11 (the detection unit 12), the control unit 19 performs character recognition by comparing the track of contact and the track in the character recognition data. In a case in which an input character is identified based on the character recognition, the control unit 19 causes the activation unit 18 to activate an application, and causes the input character to be input into the character input area of the application. The control unit 19 controls the display unit 11 to display a screen based on the application thus activated, in which the input character is input into the character input area thereof.

Figure 8A:
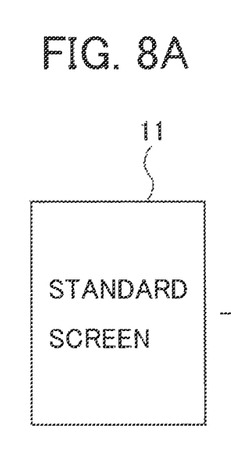
FIG. 8 is a diagram for illustrating a fourth state of the display unit 11.
Figure 8B:
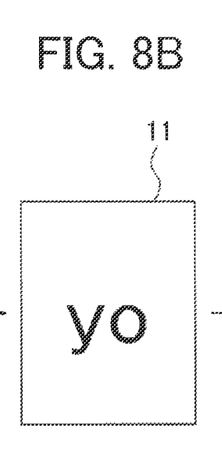
Figure 8C:
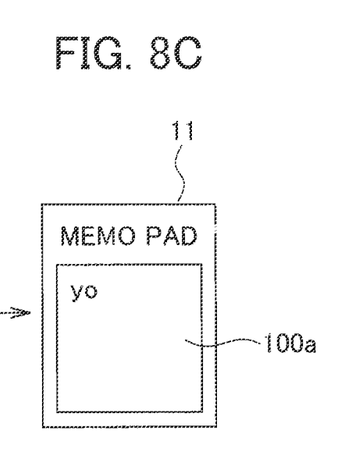
Figure 9A:
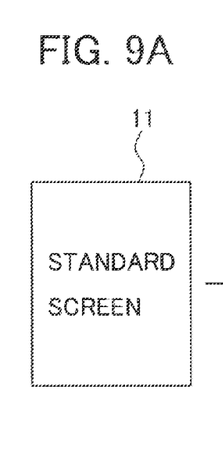
FIG. 9 is a diagram for illustrating a fifth state of the display unit 11.
Figure 9B:
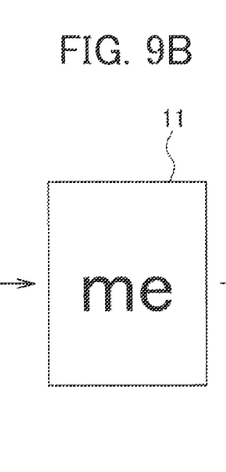
Figure 9C:
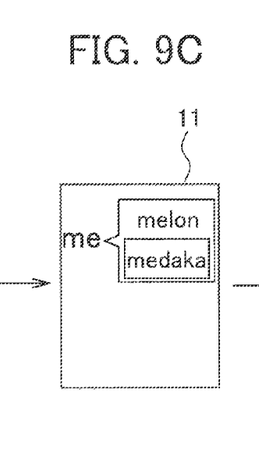
Figure 9D:
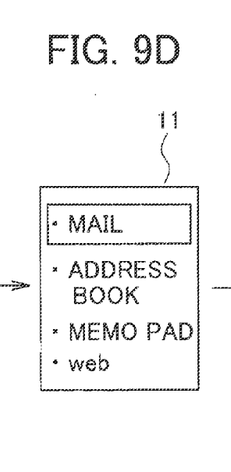
Figure 9E:
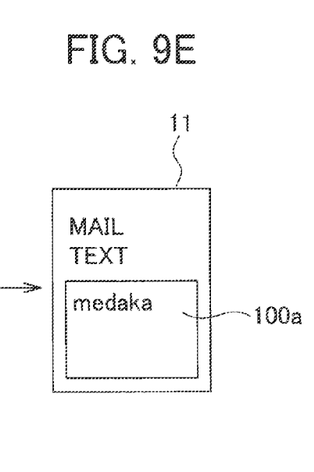

Here, descriptions are provided for an example with reference to FIG. 8, in which the memo pad application is activated to input characters into the memo pad application. FIG. 8 is a diagram for illustrating a fourth state of the display unit 11. In a state where the standard screen is displayed on the display unit 11 (see FIG. 8A), in a case in which a hiragana character "yo" is input by way of a contact object via the display unit 11 (the detection unit 12) (see FIG. 8B), the control unit 19 performs character recognition by comparing the track of contact and the track in the character recognition data. In a case in which the input character is identified as the hiragana character "yo" based on the character recognition, the control unit 19 activates, for example, the memo pad application. The control unit 19 causes the hiragana character "yo" to be input into a memo input area (the character input area 100a) of the memo pad application. The control unit 19 controls the display unit 11 to display a screen, in which the hiragana character "yo" is input into the memo input area (see FIG. 8C).

Therefore, the mobile telephone device 1 activates an application based on performing recognition of a character, and causes the character to be input into the application; accordingly, simply by determining that a character is being input, the character can be input into the application, and the application can be activated in a state where the input character is displayed.

In a case in which the control unit 19 causes the activation unit 18 to activate an application to input a character into the application, the control unit 19 may cause the activation unit 18 to activate a preset application to input a character into the application thus activated.

Regarding setting for activating applications, for example, the user may set any one of a plurality of applications, or the control unit 19 may set an application that is most frequently activated among the plurality of applications.

Here, a specific example is described with reference to FIG. 9, in which the user sets any one of a plurality of applications. FIG. 9 is a diagram for illustrating a fifth state of the display unit 11. In a state where the standard screen is displayed on the display unit 11 (see FIG. 9A), in a case in which a hiragana character "me" is input by way of a contact object via the display unit 11 (the detection unit 12) (see FIG. 9B), the control unit 19 performs character recognition by comparing the track of contact and the track in the character recognition data. As a result of the character recognition, the control unit 19 determines that the input character is the hiragana character "me", and controls the display unit 11 to display predictive conversion candidates "melon" and "medaka (Japanese killifish)" with the initial character "me" (see FIG. 9C). In addition, in a case in which the user selects, for example, "medaka" from the predictive conversion candidates, the control unit 19 controls the display unit 11 to display application names "mail", "address book", "memo pad" and "web" corresponding to the plurality of applications, respectively (see FIG. 9D). In addition, in a case in which the user selects, for example, "mail" from the plurality of application names, the control unit 19 causes the mail application to be activated, in which the mail application corresponds to the application name "mail". The control unit 19 controls the display unit 11 to display a screen (image) of the mail application, in which the conversion candidate character "medaka" selected by the user is input into the character input area 100a (see FIG. 9E).

The specific example has been described for a case in which a screen for selecting an application name is displayed when a predictive conversion candidate is selected. As another example, a screen for selecting an application name may be displayed in a case in which an input of a sentence is completed. In this case, the sentence is input into a character input area of the application thus selected.

Therefore, the mobile telephone device 1 activates a preset application based on performing recognition of a character, and causes the character to be input into the application; accordingly, simply by determining that characters are being input, the character can be input into the application, and the application can be activated in a state where the input character is displayed.

As a case in which the control unit 19 causes the activation unit 18 to activate an application to input a character into the application, after determining that characters are being input based on the track of contact, the control unit 19 may cause the display unit 11 to display a plurality of names of applications enabling an input of characters, may cause the activation unit 18 to activate an application corresponding to an application name selected from the plurality of application names, and may cause the character to be input into the application thus activated.

As a specific example, in a case in which the user writes a hiragana character "yo" on the surface of the display unit (the detection unit 12), the control unit 19 performs character recognition based on a track of writing the hiragana character "yo". As a result of the character recognition, the control unit 19 determines that the hiragana character "yo" is being input, and determines that characters are being input. In a case in which the input of the hiragana character "yo" is completed, i.e. in a case in which the detection unit 12 does not further detect contact of the contact object within a predetermined period after detecting the contact of the contact object for inputting the hiragana character "yo", the control unit 19 controls the display unit 11 to display names of applications enabling an input of characters such as "memo pad", "mail", "browser" and "address book". In a case in which the user selects "memo pad", the control unit 19 causes the activation unit 18 to activate the memo pad application, and causes the hiragana character "yo" to be input into the memo input area of the memo pad application.

As discussed above, based on performing recognition of a character, the mobile telephone device 1 causes the display unit 11 to display names of applications enabling an input of characters, activates an application corresponding to a selected application name, and causes the character to be input into the application thus activated. Therefore, with the mobile telephone device 1, simply by determining that a character is being input, the character can be input into an application, and the application can be activated in a state where the input character is displayed.

As a case in which the control unit 19 causes the activation unit 18 to activate an application to input a character into the application, after determining that characters are being input based on the track of contact, the control unit 19 may cause the display unit 11 to display a plurality of words predicted from the character thus input, may cause the activation unit 18 to activate an application when a word is selected from the plurality of words, and may cause the word thus selected to be input into the application.

More specifically, in a case in which an input character is identified based on character recognition, the control unit 19 causes the display unit 11 to display a plurality of prediction conversion candidates (words) for converting the input character into a word. In a case in which the user selects one of a plurality of predictive conversion candidates, the control unit 19 causes the prediction conversion candidate thus selected to be input into an application activated by the activation unit 18.

As a specific example, in a case in which an input character is identified as a hiragana character "me" based on character recognition, the control unit 19 causes the display unit 11 to display prediction conversion candidates such as "melon" and "medaka" for converting the hiragana character "me" into a word. In a case in which the user selects "melon", the control unit 19 causes "melon" to be input into a character input area of an application activated by the activation unit 18. Similarly, in a case in which an input character is identified as an alphabetic character "C" as a result of character recognition, the control unit 19 causes the display unit 11 to display prediction conversion candidates such as "California" and "Chicago" for converting the alphabetic character "C" into a word. In a case in which the user selects "California", the control unit 19 causes "California" to be input into a character input area of an application activated by the activation unit 18.

Regarding an application activated by way of the activation unit 18, a preset application may be activated by way of the activation unit 18 as described above, or an application corresponding to an application name selected from a plurality of application names may be activated by way of the activation unit 18.

Therefore, with the mobile telephone device 1, in a case of selecting one of a plurality of words (predictive conversion candidates) predicted based on an input character, the word thus selected is input into the character input area of the application thus activated; accordingly, the word can be input into the application, and the application can be activated in a state where the input character is displayed.

It is preferable for the activation unit 18 to be capable of activating the call originating application. In this case, it is preferable for the control unit 19 to be capable of determining that numeric characters are being input based on the track of contact, and in a case of determining that numeric characters are being input based on the track of contact detected by the detection unit 12, it is preferable for the control unit 19 to cause the activation unit 18 to activate the call originating application.

More specifically, based on the position information (information about positions where the contact object moves) provided from the detection unit 12, the control unit 19 identifies a track of contact of the contact object that moves while touching the surface of the display unit 11.

The control unit 19 determines whether numeric characters are being input based on the track of contact of the contact object. For example, the determination may be made as follows. More specifically, the control unit 19 compares an identified track with numeric character recognition data that is stored beforehand in the memory 16 (data for associating a numeric character with a track pattern of writing the numeric character), and in a case in which the identified track coincides with the track in the numeric character recognition data, the control unit 19 determines that a numeric character associated with the track in the numeric character recognition data is being input. On the other hand, in a case in which the identified track does not coincide with the track in the numeric character recognition data, the control unit 19 determines that numeric characters are not being input.

In a case in which the control unit 19 determines that numeric characters are being input, the control unit 19 causes the activation unit 18 to activate the call originating application.

The call originating application is an application capable of making a telephone call by utilizing the communication unit 15.

Figure 10A:
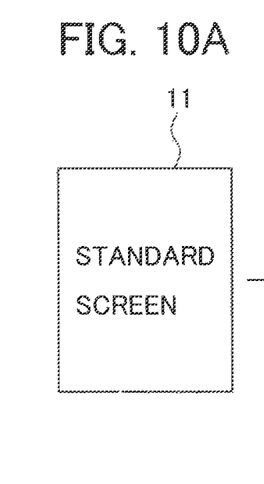
FIG. 10 is a diagram for illustrating a sixth state of the display unit 11.
Figure 10B:
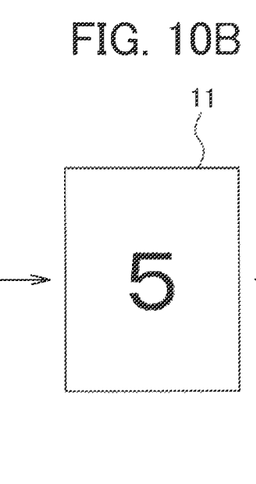
Figure 10C:
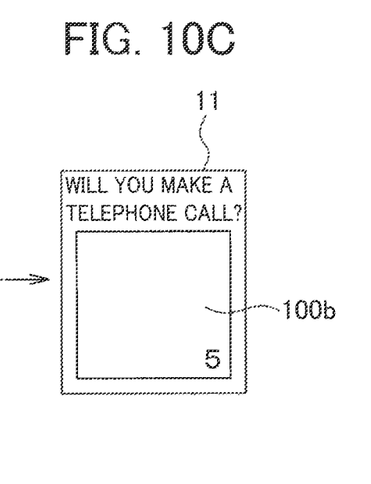

Here, with reference to FIG. 10, descriptions are provided for a specific example of activating the call originating application. FIG. 10 is a diagram for illustrating a sixth state of the display unit 11. In a state where the standard screen is displayed on the display unit 11 (see FIG. 10A), in a case in which a numeric character "5" is input by way of a contact object via the display unit 11 (the detection unit 12) (see FIG. 10B), the control unit 19 performs character recognition by comparing the track of contact and the track in the numeric character recognition data. As a result of the numeric character recognition, the control unit 19 determines that the numeric character "5" is being input, and activates the call originating application. The control unit 19 causes the numeric character "5" to be into an area (a numeric character input area 100b), into which numeric characters are input for the call originating application. The control unit 19 controls the display unit 11 to display a screen (image), in which the numeric character "5" is input into the numeric character input area 100b (see FIG. 10C).

The specific example has been described for a case in which the call originating application is activated when a single numeric character is input. As another example, the call originating application may be activated when all digits of a numeric character string as a telephone number are input.

Therefore, since the call originating application is activated in a case in which the mobile telephone device 1 determines that numeric characters are being input based on the track of contact of a contact object, the call originating application can be easily activated.

In a case in which the activation unit 18 activates the call originating application, the control unit 19 may cause the display unit 11 to display (dispose) keys enabling an input of numeric characters in order to input numeric characters thereafter. In a case in which such keys are operated (touched), the control unit 19 causes numeric characters, which are assigned to the keys thus operated, to be input into the call originating application.

In a case in which the control unit 19 determines that numeric characters are being input, the control unit 19 may determine that numeric characters are being input after a predetermined period of time has elapsed since the detection unit 12 ceased to detect contact of a contact object. As a result, the control unit 19 can distinguish, for example, whether a longitudinal line is drawn in a sequence of inputting a hiragana character "ha", or a numeric character "1" is input.

In the abovementioned embodiment, in a case in which the identified track coincides with the track in the character recognition data or the numeric character recognition data, determination is made such that non-numeric characters or numeric characters associated with the data are being input; however, also in a case in which the identified track coincides with a part of the character recognition data or a part of the numeric character recognition data, determination may be made such that non-numeric characters or numeric characters associated with the data are being input.

In a case in which the control unit 19 determines that characters or numeric characters are not being input based on the track of contact detected by the detection unit 12, it is preferable for the display unit 11 to display a menu screen for selecting an application from a plurality of applications.

The control unit 19 determines whether characters or numeric characters are being input based on the track of contact of the contact object. For example, the track of contact of the contact object is compared with the character recognition data and the numeric character recognition data as described above, and in a case in which the track of contact of the contact object does not coincide with any of the track in the character recognition data and the track in the numeric character recognition data, the determination may be made such that characters and numeric characters are not being input. In a case in which the control unit 19 determines that characters and numeric characters are not being input, the control unit 19 controls the display unit 11 to switch the standard screen to the menu screen.

Therefore, in a case in which the mobile telephone device 1 determines that characters or numeric characters are not being input, the mobile telephone device 1 determines that the contact is a touch by a contact object, and causes the display unit 11 to display the menu screen; as a result, the user can select any one of a plurality of applications.

Figure 4:
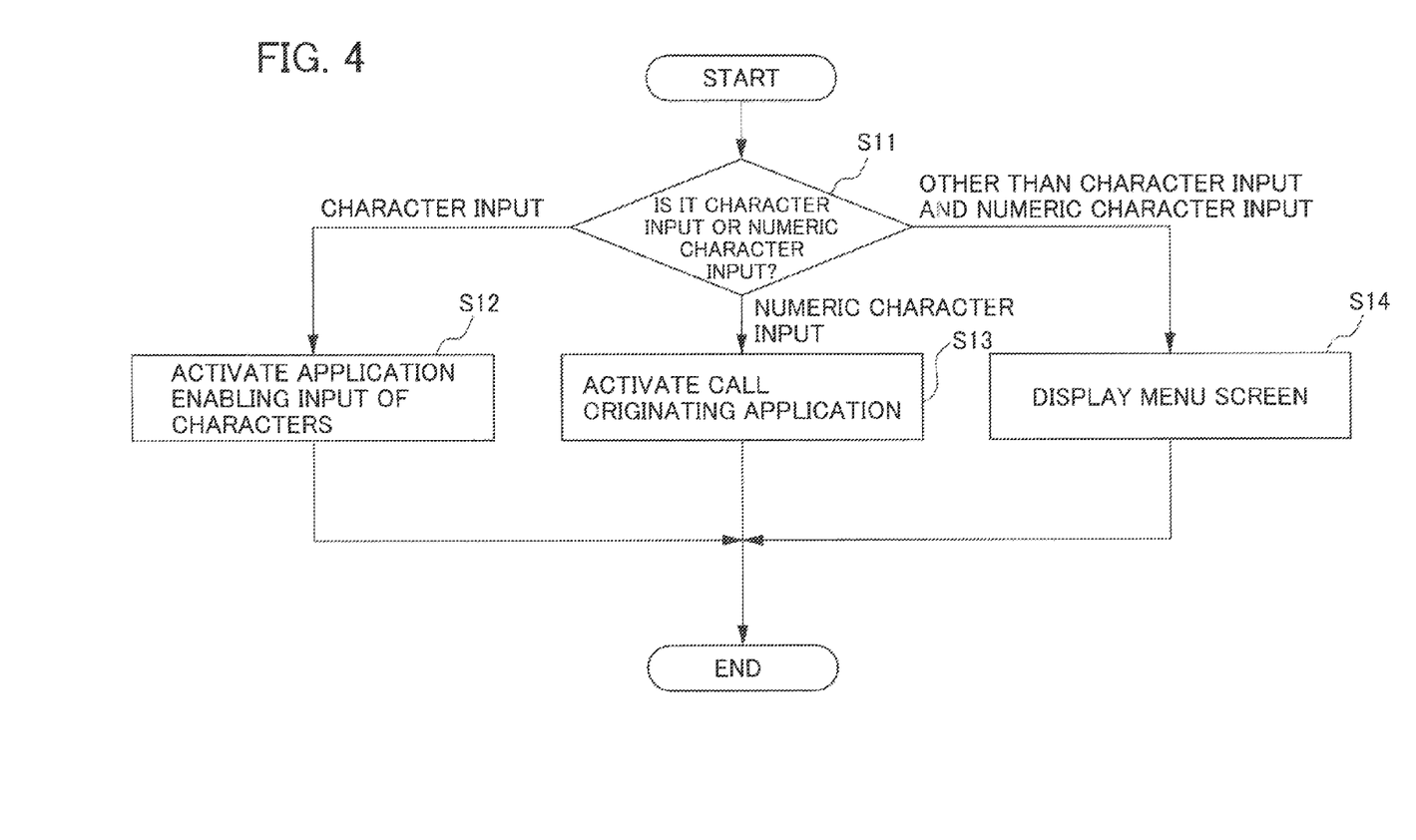
FIG. 4 is a flowchart for illustrating operations of the mobile telephone device in a case of executing processing of activating an application, or executing processing of displaying a menu screen.

Next, descriptions are provided for operations of the mobile telephone device 1 when an application is activated or the menu screen is displayed on the display unit 11. FIG. 4 is a flowchart for illustrating the operations of the mobile telephone device 1 in a case of executing processing for activating an application, or executing processing for displaying the menu screen.

In Step S11, in a state where the standard screen is displayed on the display unit 11, the control unit 19 determines whether a character or a numeric character was input by way of a contact object. More specifically, based on a track of a contact object touching the display unit 11 (the detection unit 12), determination is made as to whether characters are being input, numeric characters are being input, or characters and numeric characters are not being input. In a case in which the determination is that characters are being input, the processing advances to Step S12. In a case in which the determination is that numeric characters are being input, the processing advances to Step S13. In a case in which the determination is that characters and numeric characters are not being input, the processing advances to Step S14.

In Step S12, based on the input character, the control unit 19 causes the activation unit 18 to activate an application enabling an input of characters.

In Step S13, the control unit 19 causes the activation unit 18 to activate the call originating application.

The processing of activating an application is terminated by executing the processing in Step S12 or S13. Subsequently, processing corresponding to each application thus activated is executed.

In Step S14, the control unit 19 causes the display unit 11 to display the menu screen. The processing for displaying the menu screen is terminated by executing the processing in Step S14. Subsequently, for example, as a result of selecting any application from the menu screen, the activation unit 18 executes processing of activating the application thus selected.

As described above, the mobile telephone device 1 can reduce the number of operations required for activating an application, as compared to conventional cases.

As described above, the embodiment has been described by illustrating the cases in which the present invention is applied to the mobile telephone device 1. However, the present invention is not limited to the aforementioned embodiment, and may also be applied to an electronic device such as a PHS (Personal Handyphone System), a PDA (Personal Digital Assistant), or a portable navigation device.

The invention claimed is:

1. A portable electronic device, comprising:
an activation unit that activates an application enabling at least an input of characters;
a display unit that displays a screen based on the application;
a detection unit that detects contact to the display unit and
a control unit that identifies a track of contact to the display unit according to the contact to the display unit detected by the detection unit in a state where an initial screen is displayed on the display unit, and when a character input state is identified by the track of contact as identified, causes the activation unit to activate the application and display an application screen as the screen based on the application, wherein in a case in which the control unit determines that initial characters are being input based on the track of contact on the initial screen, the control unit causes the activation unit to activate the application enabling at least the input of characters, and causing the initial characters corresponding to the track of the contact as identified on the initial screen to be input and displayed in a character input region of the application screen.

2. The portable electronic device according to claim 1, wherein, in a case in which the control unit determines that characters are being input based on the track of contact, the control unit causes the activation unit to activate the application based on an input character that was input.

3. The portable electronic device according to claim 2, wherein the application based on the input character is an application having an application name including the input character.

4. The portable electronic device according to claim 2, wherein, in a case in which application names of a plurality of applications predicted based on the input character are displayed on the display unit, the application based on the input character is an application corresponding to a single application name selected from the plurality of application names.

5. The portable electronic device according to claim 1, wherein the application activated by the activation unit is a preset application.

6. The portable electronic device according to claim 1, wherein, in a case in which application names of a plurality of applications enabling an input of characters are displayed on the display unit, the application activated by the activation unit is an application corresponding to a single application name selected from the plurality of application names.

7. The portable electronic device according to claim 1, wherein, after the input character is input into the application, in a case in which a single application is selected from applications enabling an input of characters, the control unit causes the single application thus selected to be activated, and causes the input character to be input into the single application.

8. The portable electronic device according to claim 1, wherein the control unit causes the display unit to display a plurality of words predicted based on the input character, and when a single word is selected from the plurality of words, the control unit causes the activation unit to activate the application, and causes the word thus selected to be input into the application.

9. The portable electronic device according to claim 1, wherein the activation unit is capable of activating a call originating application, and
wherein the control unit is capable of determining that numeric characters are being input based on the track of contact, and in a case of determining that the numeric characters are being input based on the track of contact detected by the detection unit, the control unit causes the activation unit to activate the call originating application.

10. The portable electronic device according to claim 8, wherein, in a case in which the control unit determines that characters or numeric characters are not being input based on the track of contact detected by the detection unit, the control unit causes the display unit to display a menu screen for selecting a single application from a plurality of applications.

11. A method of controlling a portable electronic device including a display unit configured for displaying a screen based on an application at least enabling an input of characters, the method comprising:
a detecting step of detecting contact to the display unit; and
an activating step of identifying a track of contact to the display unit according to the contact to the display unit detected in the detecting step in a state where an initial screen is displayed on the display unit, and when a character input state is identified by the track of contact as identified, causing an activation unit to activate the application and display an application screen as the screen based on the application,
wherein in a case in which it is determined that initial characters are being input based on the track of contact on the initial screen, the activating step causes the activation unit to activate the application enabling the input of characters, and causing the initial characters corresponding to the track of the contact as identified on the initial screen to be input and displayed in a character input region of the application screen.

* * * * *